(12) United States Patent
Lee (10) Patent No.: US 9,491,830 B2
(45) Date of Patent: Nov. 8, 2016

(54) COMPENSATION UNIT AND ORGANIC LIGHT EMITTING DISPLAY INCLUDING THE SAME

(71) Applicant: Samsung Display Co., Ltd., Yongin (KR)

(72) Inventor: Wook Lee, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 243 days.

(21) Appl. No.: 14/036,401

(22) Filed: Sep. 25, 2013

(65) Prior Publication Data

US 2014/0347253 A1    Nov. 27, 2014

(30) Foreign Application Priority Data

May 24, 2013    (KR) .................. 10-2013-0059014

(51) Int. Cl.
  *H05B 33/08*    (2006.01)
  *G09G 3/32*    (2016.01)

(52) U.S. Cl.
  CPC ........ *H05B 33/0896* (2013.01); *G09G 3/3233* (2013.01); *G09G 3/3275* (2013.01); *G09G 2300/043* (2013.01); *G09G 2300/0819* (2013.01); *G09G 2300/0842* (2013.01); *G09G 2310/0216* (2013.01); *G09G 2320/0233* (2013.01); *G09G 2320/0285* (2013.01); *G09G 2320/045* (2013.01)

(58) Field of Classification Search
  CPC ............... G09G 2300/043; G09G 2300/0819; G09G 2300/0842; G09G 2310/0216; G09G 2320/0233; G09G 2320/0285; G09G 2320/045; G09G 3/3233; G09G 3/3275; H05B 33/0896

USPC ................................................. 345/211–212
See application file for complete search history.

(56) References Cited

U.S. PATENT DOCUMENTS

| 7,245,277 | B2 | 7/2007 | Ishizuka |
| 8,963,638 | B2* | 2/2015 | Chen ........................... 330/255 |
| 2002/0101172 | A1* | 8/2002 | Bu ............................. 315/169.3 |
| 2007/0024540 | A1 | 2/2007 | Ryu et al. |
| 2008/0231562 | A1* | 9/2008 | Kwon ............................. 345/77 |
| 2010/0097126 | A1* | 4/2010 | Yamazaki ............. H03L 7/0898 327/536 |
| 2011/0007067 | A1 | 1/2011 | Ryu et al. |
| 2012/0169704 | A1* | 7/2012 | Chung .......................... 345/212 |

FOREIGN PATENT DOCUMENTS

| KR | 10-2007-0015822 | 2/2007 |
| KR | 10-2011-0005500 | 1/2011 |

* cited by examiner

*Primary Examiner* — Quan-Zhen Wang
*Assistant Examiner* — Tony Davis
(74) *Attorney, Agent, or Firm* — H.C. Park & Associates, PLC (57) ABSTRACT

A compensation unit includes a current source unit, a current sink unit, a sensing resistor, a comparator, and a memory. The current source unit is configured to supply a first reference current to a first node. The current sink unit is configured to sink a second reference current from the first node. The sensing resistor is coupled between the first node and a second node. The comparator is configured to: compare a voltage at the first node with a voltage at the second node, and output a comparison result signal based on the comparison. The memory unit is configured to: store compensation data related to operational disparity of at least one organic light emitting diode and/or of at least one driving transistor, output the compensation data, and modify the compensation data based on the comparison result signal.

22 Claims, 10 Drawing Sheets

COMPENSATION UNIT AND ORGANIC LIGHT EMITTING DISPLAY INCLUDING THE SAME

CROSS-REFERENCE TO RELATED APPLICATION

This application claims priority from and the benefit of Korean Patent Application No. 10-2013-0059014, filed on May 24, 2013, which is incorporated by reference for all purposes as if set forth herein.

BACKGROUND

1. Field

Exemplary embodiments relate to display technology, and, more particularly, to organic light emitting displays.

2. Discussion

Various types of flat panel displays have been developed for numerous reasons, such as, for instance, reducing the weight and volume of conventional cathode ray tubes. Flat panel displays may include, for example, liquid crystal displays, field emission displays, plasma displays, organic light emitting displays, electrophoretic displays, electrowetting displays, and the like. Among these flat panel displays, organic light emitting displays may be configured to display images using organic light emitting diodes that emit light through recombination of electrons and holes. To this end, organic light emitting displays typically have a relatively fast response time and usually consume relatively low amounts of power. Improvements, however, may still be achieved to increase the display quality of flat panel display devices.

The above information disclosed in this Background section is only for enhancement of understanding of the background of the invention, and, therefore, it may contain information that does not form the prior art that is already known in this country to a person of ordinary skill in the art.

SUMMARY

Exemplary embodiments provide a compensation unit, and an organic light emitting display including the same, that is configured to enable the display of a uniform (or substantially uniform) image by compensating for degradation of one or more organic light emitting diodes and/or a difference(s) in threshold voltage/mobility of one or more driving transistors.

Additional aspects will be set forth in the detailed description which follows and, in part, will be apparent from the disclosure, or may be learned by practice of the invention.

According to exemplary embodiments, a compensation unit, includes: a current source unit configured to supply a first reference current to a first node; a current sink unit configured to sink a second reference current from the first node; a sensing resistor coupled between the first node and a second node; a comparator configured to: compare the voltage at the first node with the voltage at the second node, and output a comparison result signal based on the comparison; and a memory unit configured to: store compensation data related to operational disparity of at least one organic light emitting diode and/or of at least one driving transistor, output the compensation data, and modify the compensation data based on the comparison result signal.

According to exemplary embodiments, an organic light emitting display, includes: a pixel unit comprising pixels arranged at intersection portions of data lines with scan lines and sensing control lines; a data driver configured to supply data signals to output lines; a scan driver configured to supply a scan signal to the scan lines; a control line driver configured to supply a sensing control signal to the sensing control lines; and a compensation unit coupled between the output lines and the data lines, wherein the compensation unit comprises a compensation circuit disposed between an i-th (where "i" is a natural number greater than zero) output line and an i-th data line, the compensation circuit comprising: a current source unit configured to supply a first reference current to the i-th data line, a current sink unit configured to sink a second reference current from the i-th data line, a sensing resistor coupled between the i-th data line and the i-th output line, a comparator configured to: compare a voltage of the i-th data line with a voltage of the i-th output line, and output a comparison result signal based on the comparison, and a memory unit configured to: store compensation data related to operational disparity of respective organic light emitting diodes of the pixels and/or of respective driving transistors configured to correspondingly drive the organic light emitting diodes, output the compensation data, and modify the compensation data based on the comparison result signal.

According to exemplary embodiments, a method, includes: causing, at least in part, a first reference current to be supplied to a first node coupled to a pixel comprising a light emitting component configured to emit light; determining a first voltage difference between the first node and a second node; and causing, at least in part, compensation data to be modified based on the first voltage difference, wherein the compensation data relates to operational disparity of the light emitting component.

The foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

In the following description, for the purposes of explanation, numerous specific details are set forth in order to provide a thorough understanding of various exemplary embodiments. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments.

In the accompanying figures, the size and relative sizes of layers, films, panels, regions, etc., may be exaggerated for clarity and descriptive purposes. Also, like reference numerals denote like elements.

When an element or layer is referred to as being "on," "connected to," or "coupled to" another element or layer, it may be directly on, connected to, or coupled to the other element or layer or intervening elements or layers may be present. When, however, an element or layer is referred to as being "directly on," "directly connected to," or "directly coupled to" another element or layer, there are no intervening elements or layers present. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. Like numbers refer to like elements throughout. As used herein, the term "and/or" includes any and all combinations of one or more of the associated listed items.

Although the terms first, second, etc. may be used herein to describe various elements, components, regions, layers, and/or sections, these elements, components, regions, layers, and/or sections should not be limited by these terms. These terms are used to distinguish one element, component, region, layer, and/or section from another element, component, region, layer, and/or section. Thus, a first element, component, region, layer, and/or section discussed below could be termed a second element, component, region, layer, and/or section without departing from the teachings of the present disclosure.

Spatially relative terms, such as "beneath," "below," "lower," "above," "upper," and the like, may be used herein for descriptive purposes, and, thereby, to describe one element or feature's relationship to another element(s) or feature(s) as illustrated in the drawings. Spatially relative terms are intended to encompass different orientations of an apparatus in use, operation, and/or manufacture in addition to the orientation depicted in the drawings. For example, if the apparatus in the drawings is turned over, elements described as "below" or "beneath" other elements or features would then be oriented "above" the other elements or features. Thus, the exemplary term "below" can encompass both an orientation of above and below. Furthermore, the apparatus may be otherwise oriented (e.g., rotated 90 degrees or at other orientations), and, as such, the spatially relative descriptors used herein interpreted accordingly.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

Figure 1:
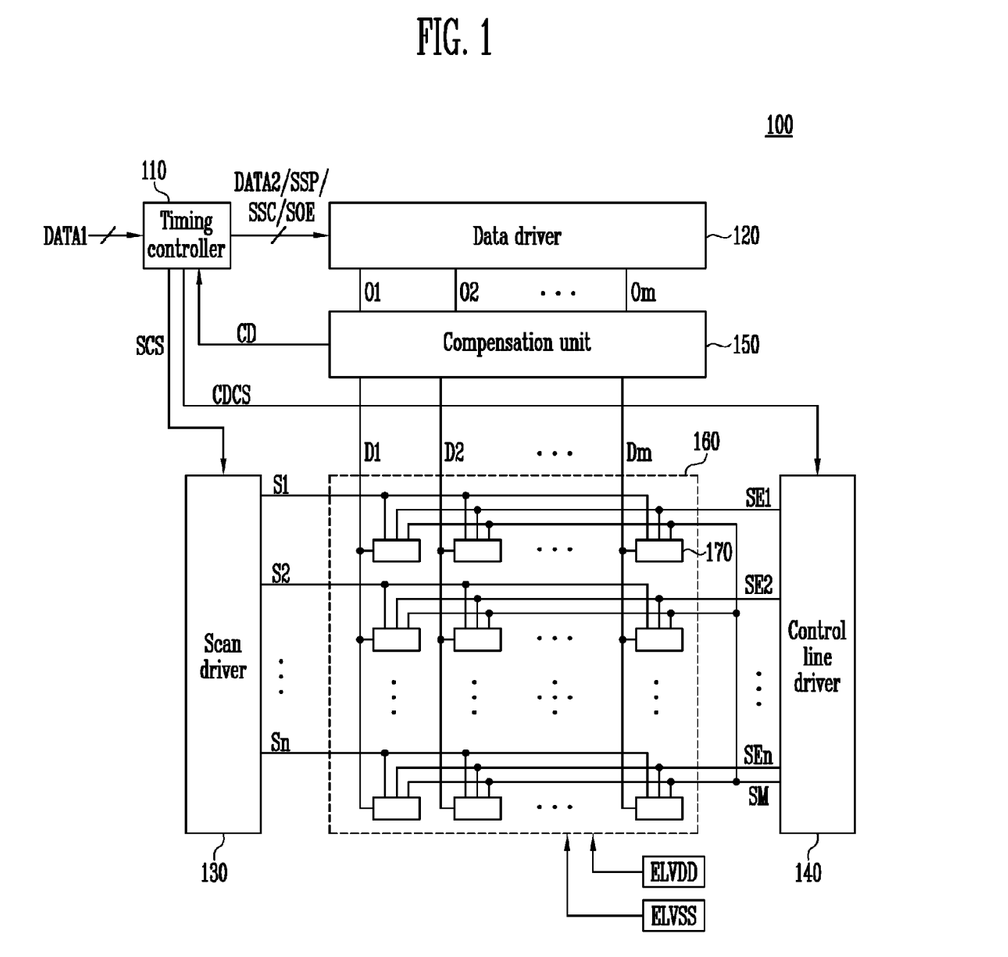
FIG. 1 is a block diagram of an organic light emitting display, according to exemplary embodiments.

FIG. 1 is a block diagram of an organic light emitting display, according to exemplary embodiments.

Referring to FIG. 1, the organic light emitting display (or display) 100 includes a timing controller 110, a data driver 120, a scan driver 130, a control line driver 140, a compensation unit 150, and a pixel unit 160. Although specific reference will be made to this particular implementation, it is also contemplated that the display 100 may embody many forms and include multiple and/or alternative components. For example, it is contemplated that the components of the display 100 may be combined, located in separate structures, and/or separate locations.

According to exemplary embodiments, the timing controller 110 may control operations of the data driver 120, the scan driver 130, the control line driver 140, and the compensation unit 150, in response to a synchronization signal (not shown) supplied from a source, e.g., a source external to the organic light emitting display 100. For example, the timing controller 110 may generate one or more data driving control signals, such as a source start pulse signal SSP, a source shift clock signal SSC, a source output enable signal SOE, etc., and supply the data driving control signals (e.g., SSP, SSC, SOE, etc.) to the data driver 120. The timing controller 110 may generate a scan driving control signal SCS and supply the scan driving control signal SCS to the scan driver 130. The timing controller 110 may also generate a control line driving control signal CDCS and supply the control line driving control signal CDCS to the control line driver 140. Further, the timing controller 110 may generate one or more switching control signals (not shown) and supply the switching control signals to the compensation unit 150.

The timing controller 110 may convert a first data signal DATA1 supplied from the source (e.g., the external source) into a second data signal DATA2, based on compensation data CD supplied from a memory unit (such as memory unit 153 of FIG. 4) included in the compensation unit 150. In this manner, the timing controller 110 may output the converted second data signal DATA2 to the data driver 120.

According to exemplary embodiments, the data driver 120 may be configured to realign the second data DATA2 supplied from the timing controller 110, in response to the one or more data driving control signals (e.g., the source start pulse signal SSP, the source shift clock signal SSC, the source output enable signal SOE, etc.) being output from the timing controller 110 and received by the data driver 120. In this manner, the data driver 120 may be configured to supply respective portions of the realigned second data signal DATA2 to corresponding output lines O1 to Om, where "m" is a natural number greater than zero. An illustrative structure and operation of the data driver 120 is described in more detail with reference to FIG. 3.

In exemplary embodiments, the scan driver 120 may be configured to supply (e.g., progressively supply) a scan signal to scan lines S1 to Sn (where "n" is a natural number greater than zero), in response to the scan driving control signal SCS being output from the timing controller 110 and received by the scan driver 120.

The control line driver 140 may be configured to supply (e.g., progressively supply) a sensing control signal to sensing control lines SE1 to SEn, in response to the control line driving control signal CDCS being output from the timing controller 110 and received by the control line driver 140. In this manner, the control line driver 140 may also be configured to supply a sensing mode control signal to a sensing mode control line SM.

According to exemplary embodiments, the compensation unit 150 may be coupled between the data driver 120 and the pixel unit 160. In this manner, the compensation unit 150 may allow the data output lines O1 to Om to be coupled to data lines D1 to Dm during a display period. The compensation unit 150 may sense degradation information of an organic light emitting diode included in one or more (e.g., each) pixel 170 of pixel unit 160 during a first sensing period. The compensation unit 150 may be configured to sense (or otherwise determine) threshold voltage/mobility information of a driving transistor included in the pixel(s) 170 during a second sensing period. To this end, the compensation unit 150 may store compensation data CD related to the degradation information of the organic light emitting diode(s) and the threshold voltage/mobility information of the driving transistor(s), and supply the stored compensation data CD to the timing controller 110. It is noted that an illustrative structure and operation of the compensation unit 150 is described in more detail with reference to FIG. 4.

In exemplary embodiments, the "display period" is a period in which a pixel 170 emits light with a luminance corresponding to a data signal output from the data driver 120. The "first sensing period" is a period in which the degradation information of an organic light emitting diode OLED included in the pixel 170 is sensed, and the value of the compensation data CD is corrected, based on the sensed result. The "second sensing period" is a period in which the threshold voltage/mobility information of a driving transistor, e.g., a second transistor M2, included in the pixel 170 is sensed, and the value of the compensation data CD is corrected, based on the sensed result.

The pixel unit 160 may include pixels 170 arranged at intersection portions of the data lines D1 to Dm, the scan lines S1 to Sn, and the sensing control lines SE1 to SEn. The data lines D1 to Dm may longitudinally extend in a first direction (e.g., a vertical direction or column direction), and the scan lines S1 to Sn and the sensing control lines SE1 to SEn may longitudinally extend in a section direction (e.g., a horizontal direction or row direction). In this manner, the data lines D1 to Dm may be spaced apart from one another in the second direction, whereas the scan lines S1 to Sn and the sensing control lines SE1 to SEn may be spaced apart from one another in the first direction. Moreover, the sensing mode control line may longitudinally extend in the second direction.

In exemplary embodiments, the timing controller 110, the data driver 120, the scan driver 130, the control line driver 140, the compensation unit 150, and/or one or more components thereof, may be implemented via one or more general purpose and/or special purpose components, such as one or more discrete circuits, digital signal processing chips, integrated circuits, application specific integrated circuits, microprocessors, processors, programmable arrays, field programmable arrays, instruction set processors, and/or the like.

According to exemplary embodiments, the features/functions/processes described herein may be implemented via software, hardware (e.g., general processor, digital signal processing (DSP) chip, an application specific integrated circuit (ASIC), field programmable gate arrays (FPGAs), etc.), firmware, or a combination thereof. In this manner, the timing controller 110, the data driver 120, the scan driver 130, the control line driver 140, the compensation unit 150, and/or one or more components thereof may include or otherwise be associated with one or more memories (not shown) including code (e.g., instructions) configured to cause the timing controller 110, the data driver 120, the scan driver 130, the control line driver 140, the compensation unit 150, and/or one or more components thereof to perform one or more of the features/functions/processes described herein.

The memories may be any medium that participates in providing code/instructions to the one or more software, hardware, and/or firmware for execution. Such memories may take many forms, including but not limited to non-volatile media, volatile media, and transmission media. Non-volatile media include, for example, optical or magnetic disks. Volatile media include dynamic memory. Transmission media include coaxial cables, copper wire and fiber optics. Transmission media can also take the form of acoustic, optical, or electromagnetic waves. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, and EPROM, a FLASH-EPROM, any other memory chip or cartridge, a carrier wave, or any other medium from which a computer can read.

Figure 2A:
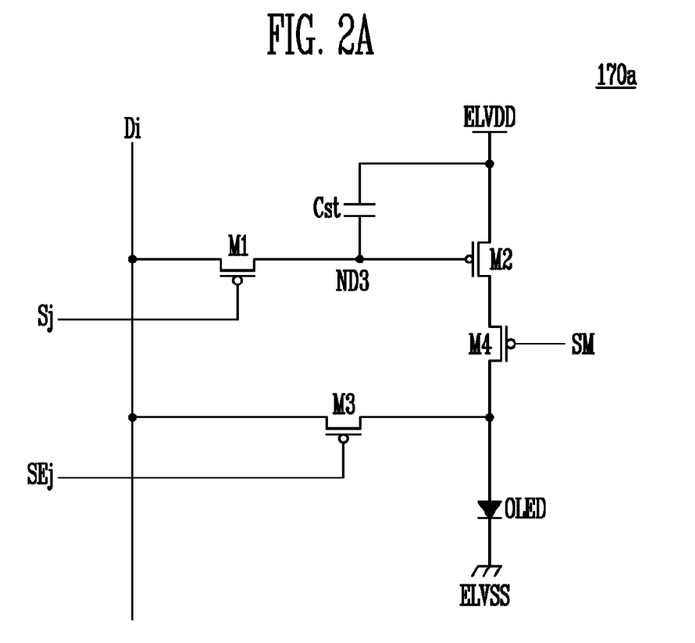
FIG. 2A is a schematic circuit diagram of a pixel of the organic light emitting display of FIG. 1, according to exemplary embodiments.

FIG. 2A is a schematic circuit diagram of a pixel of the organic light emitting display of FIG. 1, according to exemplary embodiments. It is noted that FIG. 2A illustrates a pixel positioned at the intersection portion of an i-th (where "i" is a natural number greater than zero) data line Di, a j-th (where "j" is a natural number greater than zero) scan line Sj, and a j-th sensing control line SEj. It is noted that the pixel 170a of FIG. 2A is merely illustrative, and, as such, any other suitable configuration for pixel 170a may be utilized. Moreover, pixel 170a may be representative of the various pixels 170 of the pixel unit 160.

Referring to FIG. 2A, the pixel 170a includes an organic light emitting diode OLED, a plurality of switching units (e.g., transistors) M1 to M4, and a voltage storage device (e.g., capacitor) Cst.

According to exemplary embodiments, the first transistor M1 may be coupled between a data line Di and a third node ND3. In this manner, the first transistor M1 may include a first electrode coupled to the i-th data line Di, a second electrode coupled to the third node ND3, and a gate electrode connected to the j-th scan line Sj. The first transistor M1 may be "turned on" in response to a scan signal supplied through the j-th scan line Sj.

The storage capacitor Cst may be coupled between a first power source ELVDD and the third node ND3. In this manner, the storage capacitor Cst may include a first electrode coupled to the first power source ELVDD and a second electrode coupled to the third node ND3. As such, when the first transistor M1 is "turned on," the storage capacitor Cst may charge (or otherwise store) a voltage corresponding to a data signal supplied through the i-th data line Di.

The second transistor M2 may supply current corresponding to the voltage charged in the storage capacitor Cst from the first power source ELVDD to a second power source ELVSS through the organic light emitting diode OLED. In this manner, the second transistor M2 may include a first electrode coupled to the first power source ELVDD, a second electrode coupled to a first electrode of a fourth transistor M4, which is described in more detail below, and a gate electrode coupled to the third node ND3. As such, the organic light emitting diode OLED may be configured to emit light with a luminance corresponding to the current supplied from the second transistor M2.

The third transistor M3 may be coupled between the i-th data line Di and a first electrode (e.g., an anode electrode) of the organic light emitting diode OLED. A second electrode (e.g., a cathode electrode) of the organic light emitting diode OLED may be coupled to the second power source ELVSS. In this manner, the third transistor M3 may include a first electrode coupled to the i-th data line Di, a second electrode coupled to the first electrode of the organic light emitting diode OLED, and a gate electrode coupled to the j-th sensing control line SEj. To this end, the third transistor M3 may be "turned on" in response to a sensing control signal supplied through the j-th sensing control line SEj.

The fourth transistor M4 may be coupled between the second transistor M2 and the first electrode of the organic light emitting diode OLED. In this manner, the fourth transistor M4 may include a first electrode coupled to the second electrode of the second transistor M2, a second electrode coupled to the first electrode of the organic light emitting diode OLED, and a gate electrode configured to receive a sensing mode control signal SM from the sensing mode control signal line. The fourth transistor M4 may be "turned on" in response to a sensing mode control signal SM.

Figure 2B:
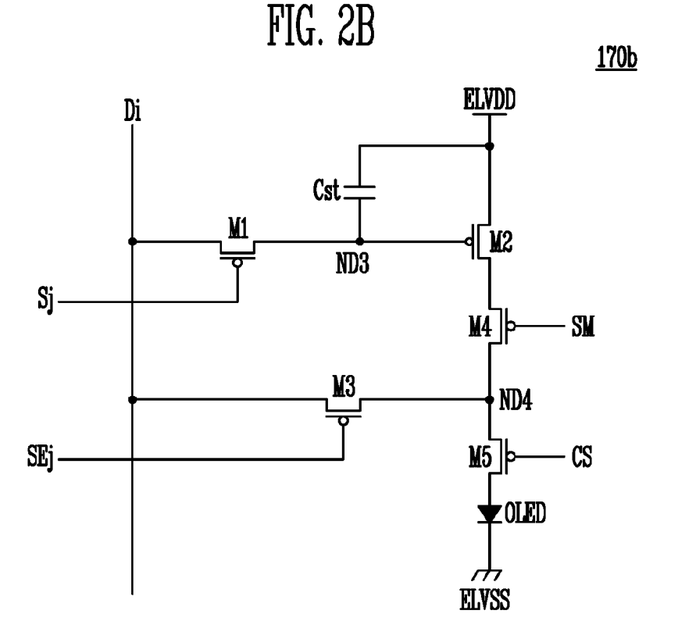
FIG. 2B is a schematic circuit diagram of a pixel of the organic light emitting display of FIG. 1, according to exemplary embodiments.

FIG. 2B is a schematic circuit diagram of a pixel of the organic light emitting display of FIG. 1, according to exemplary embodiments. As previously mentioned, pixel 170 may include various structures, and, in this manner, the pixel 170b of FIG. 2B illustrates a pixel positioned at the intersection portion of an i-th (where "i" is a natural number greater than zero) data line Di, a j-th (where "j" is a natural number greater than zero) scan line Sj, and a j-th sensing control line SEj. It is noted that the structure and operation of the pixel 170b shown in FIG. 2B may be substantially identical to those of the pixel 170a shown in FIG. 2A, except, pixel 170b may additionally include a fifth transistor M5. As such, to avoid obscuring exemplary embodiments described herein, duplicative descriptions have been omitted and differences are described in more detail in the proceeding paragraphs.

According to exemplary embodiments, the fifth transistor M5 may be coupled between the first electrode of the organic light emitting diode OLED and a fourth node ND4 at which the third and fourth transistors M3 and M4 are coupled to each other. In this manner, the fifth transistor M5 may include a first electrode coupled to fourth node ND4, a second electrode coupled to the first electrode of the organic light emitting diode OLED, and a gate electrode configured to receive a control signal CS. As such, the fifth transistor M5 may be "turned on" in response to a control signal CS output from, for instance, the control line driver 140. To this end, the fifth transistor M5 may be "turned off" during the second sensing period. That is, the fifth transistor M5 may cut off (or otherwise prevent) current from flowing through the organic light emitting diode OLED during the second sensing period.

Figure 3:
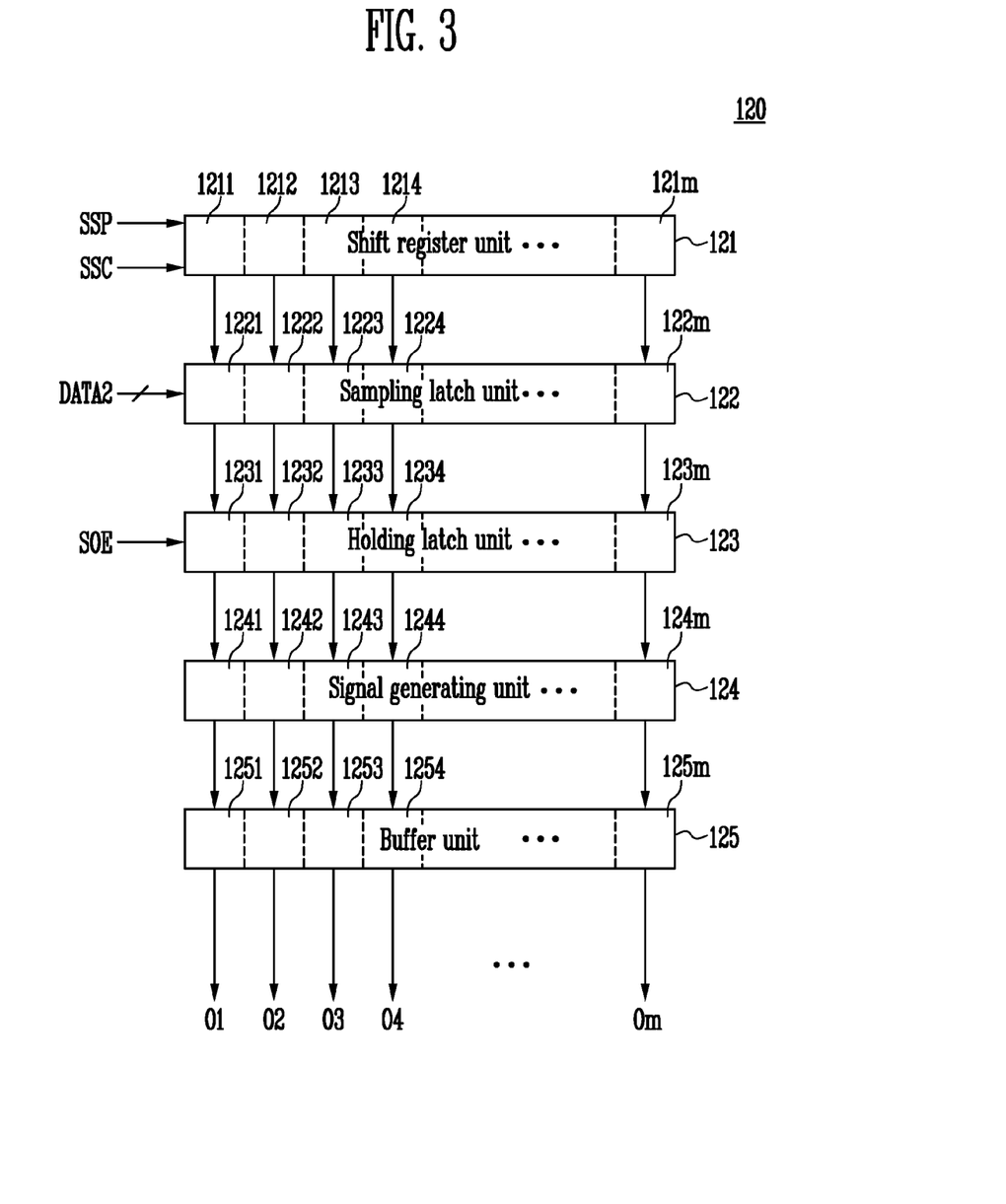
FIG. 3 is a block diagram of a data driver of the organic light emitting display of FIG. 1, according to exemplary embodiments.

FIG. 3 is a block diagram of the data driver 120 of the organic light emitting display 100 of FIG. 1, according to exemplary embodiments.

Referring to FIG. 3, the data driver 120 may include a shift register unit 121, a sampling latch unit 122, a holding latch unit 123, a signal generating unit 124, and a buffer unit 125.

According to exemplary embodiments, the shift register unit 121 may generate (e.g., progressively generate) "m" sampling signals in response to receiving a source start pulse signal SSP and a source shift clock signal SSC, which may be output from the timing controller 110. In this manner, the shift register unit 121 may generate the "m" sampling signals and shift the source start pulse signal SSP every period of the source shift clock signal SSC. To this end, the shift register unit 121 may include one or more (e.g., "m") shift registers 1211 to 121m.

The sampling latch unit 122 may be configured to store (e.g., progressively store) the second data DATA2 in response to receiving the "m" sampling signals from the shift register unit 121. As such, the sampling latch unit 122 may include one or more (e.g., "m") sampling latches 1221 to 122m configured to store "m" portions of the second data DATA2. It is noted, however, that one or more of the "m" portions of the second data DATA2 may be the same or different portions of the received second data signal DATA2.

In exemplary embodiments, the holding latch unit 123 may be configured to store the "m" portions of the second data DATA2 supplied from the sampling latch unit 122 in response to receiving a source output enable signal SOE output from the timing controller 110. As such, the holding latch unit 123 may be configured to supply, to the signal generating unit 124, the "m" portions of the second data DATA2 stored in the holding latch unit 123. It is noted that the holding latch unit 123 may include one or more (e.g., "m") holding latches 1231 to 123m.

According to exemplary embodiments, the signal generating unit 124 may be configured to convert the "m" portions of the second data DATA2 output from the holding latch unit 123 into one or more analog signals (e.g., "m" analog signals), and output the converted "m" analog signal(s) as one or more data signals (e.g., "m" data signals) to the buffer unit 125. As such, the signal generating unit 124 may include one or more (e.g., "m") digital-analog converters 1241 to 124m. That is, the signal generating unit 124 may generate the "m" data signals using the digital-analog converters 1241 to 124m respectively disposed in "channels," and supply the generated "m" data signals to the buffer unit 125.

The buffer unit 125 may be configured to supply the "m" data signals output from the signal generating unit 124 to "m" data output lines O1 to Om that are coupled between the buffer unit 125 and the compensation unit 150. In this manner, the buffer unit 125 may include one or more (e.g., "m") buffer amplifiers 1251 to 125m.

Figure 4:
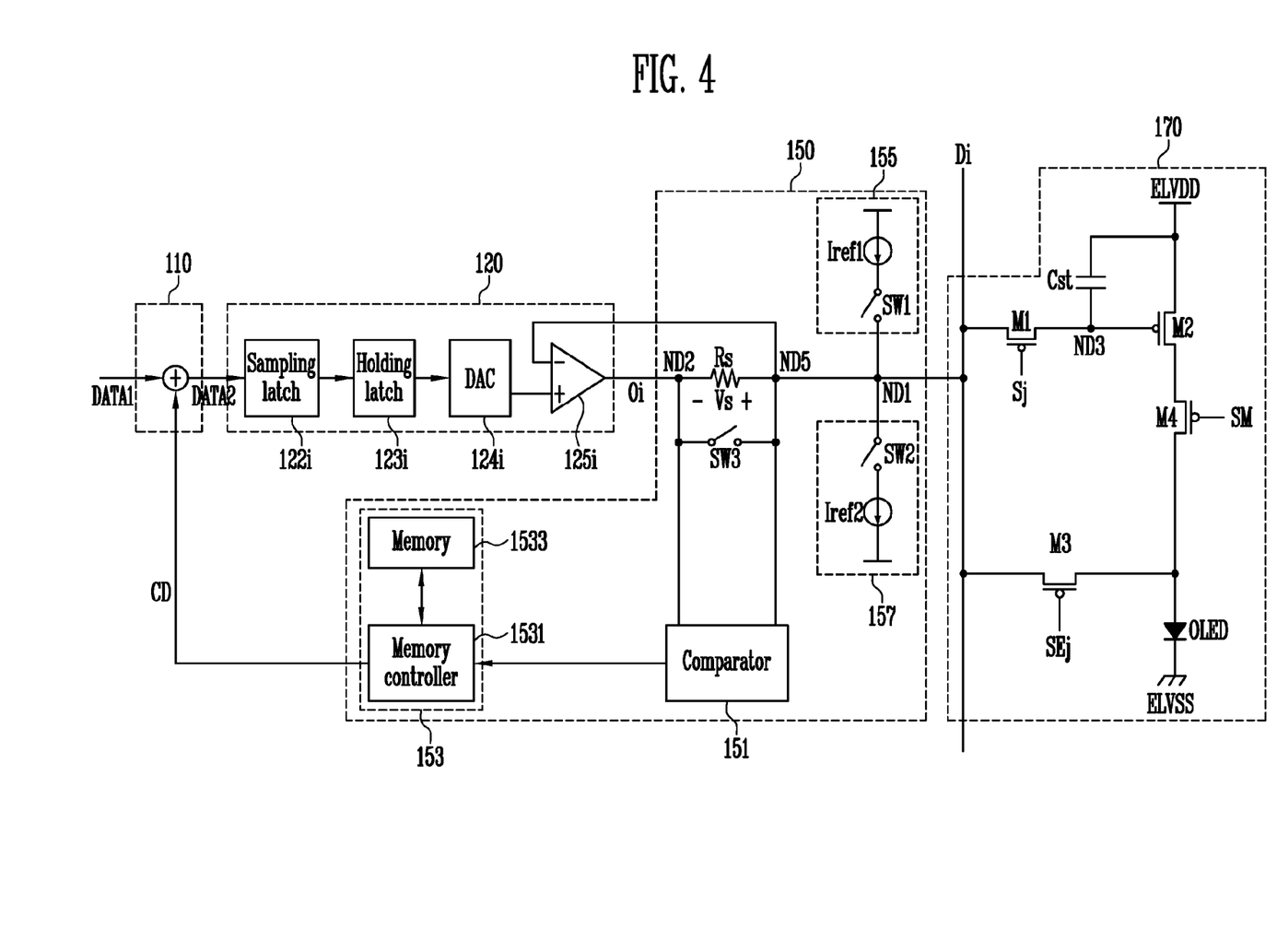
FIG. 4 is a schematic circuit diagram of a timing controller, a data driver, a compensation unit, and a pixel of the organic light emitting display of FIG. 1, according to exemplary embodiments.

FIG. 4 is a schematic circuit diagram of the timing controller 110, the data driver 120, the compensation unit 150, and the pixel 170 of the display 100 of FIG. 1, according to exemplary embodiments. For illustrative convenience, the timing controller 110 and the data driver 120 are partially shown in FIG. 4. In addition, the structure is shown with respect to an i-th channel of the "m" channels described in association with FIG. 3. To this end, FIG. 4 illustrates a pixel 170 positioned at the intersection portion of an i-th data line Di, a j-th scan line Sj, and a j-th sensing control line SEj. To this end, an i-th output line Oi extends between the data driver 120 and the compensation unit 150 with respect to the i-th channel.

Referring to FIG. 4, the timing controller 110 may be configured to convert a first data signal DATA1 supplied from a source (e.g., an external source), in response to compensation data CD supplied from the compensation unit 150. In this manner, the timing controller 110 may be configured to output the converted first data DATA1 as a second data signal DATA2 to the data driver 120.

The data driver 120 may convert the second data signal DATA2 output from the timing controller 110 into an analog signal and supply the converted analog signal as a data signal to an i-th data output line Oi. With respect to the conversion of the second data signal DATA2, that data driver 120 includes an i-th sampling latch 122i to latch data corresponding to an i-th channel of the second data signal DATA2 output from the timing controller 110. In this manner, the i-th sampling latch 122i may be configured to output the latched data to an i-th holding latch 123i. The i-th holding latch 123i may latch the data output from the i-th sampling latch 122i in response to a source output enable signal SOE. To this end, the i-th holding latch 123i may output the latched data to an i-th digital-analog converter 124i.

According to exemplary embodiments, the i-th digital-analog converter (DAC) 124i may be configured to convert the data output from the i-th holding latch 123i into an analog signal, and output the converted analog signal to an i-th buffer amplifier 125i. In this manner, the i-th buffer amplifier 125i may be configured to supply the analog signal output from the i-th digital-analog converter 124i as a data signal to the i-th data output line Oi. It is noted that a first input terminal of the i-th buffer amplifier 125i may be coupled to the i-th digital-analog converter 124i, a second input of the i-th buffer amplifier may be coupled to a fifth node ND5, which may be coupled to the first node ND1 and, thereby, an i-th data line Di. An output terminal of the i-th buffer amplifier 125i may be coupled to a second node ND2 via the i-th data output line Oi.

In exemplary embodiments, the compensation unit 150 may include a sensing resistor Rs, a third switch SW3, a comparator 151, a memory unit 153, a current source unit 155, and a current sink unit 157.

The sensing resistor Rs may be coupled between the first and second nodes ND1 and ND2, e.g., coupled between the second and fifth nodes ND2 and ND5. In other words, the sensing resistor Rs may be coupled between the i-th data line Di and the i-th output line Oi.

The third switch SW3 may be coupled between the first and second nodes ND1 and ND2, e.g., between the second and fifth nodes ND2 and ND5. The third switch SW3 may be turned on during the display period in response to a switching control signal (not shown) output from the timing controller 110. That is, the third switch SW3 may allow the i-th data output line Oi and the i-th data line Di to be coupled to each other during the display period.

The comparator 151 may output a comparison result signal to the memory unit 153 based on the polarity of a voltage Vs across the sensing resistor Rs. In other words, the comparator 151 may compare the voltage at the fifth node ND5 with the voltage at the second node ND2, and output a comparison result signal to the memory unit 153 based on the comparison of the voltages. For example, when the voltage at the fifth node ND5 is greater than the voltage at the second node ND2, the comparator 151 may output a comparison result signal for increasing the value of compensation data CD stored in the memory unit 153. When the voltage at the fifth node ND5 is smaller than the voltage at the second node ND2, the comparator 151 may output a comparison result signal for decreasing the value of the compensation data CD stored in the memory unit 153. When the voltage at the fifth node ND5 is equal to the voltage at the second node ND2, the comparator 151 may output a comparison result signal to hold the value of the compensation data CD stored in the memory unit 153 constant and/or output a result indicating that no compensation data CD is required.

According to exemplary embodiments, the memory unit 153 may store compensation data CD related to degradation information of the organic light emitting diode OLED and threshold voltage/mobility information of the driving transistor, e.g., the second transistor M2 of the pixel 170. In this manner, the memory unit 153 may be configured to correct value of the stored compensation data CD in response to the comparison result signal output from the comparator 151 during the first or second sensing period. The memory unit 153 may be configured to supply, to the timing controller 110, the compensation data CD corresponding to pixel 170 to which a data signal is to be supplied during the display period.

In exemplary embodiments, the memory unit 153 may include a memory controller 1531 and a memory 1533. The memory 1533 may store the compensation data CD related to the degradation information of the organic light emitting diode OLED and the threshold voltage/mobility information of the second transistor M2. The memory controller 1531 may be configured to correct the value of the compensation data CD stored in the memory 1533 in response to the comparison result signal output from the comparator 151. In this manner, the memory controller 1531 may read, from the memory 1533, the compensation data CD corresponding to the pixel 170 to which the data signal is to be supplied during the display period, and supply the read compensation data CD to the timing controller 110. As such, the timing controller 110 may be configured to output, to the data driver 120, a second data signal DATA2 obtained by adding the first data signal DATA1 supplied from the source and the compensation data CD.

The current source unit 155 may be configured to supply a first reference current to the first node ND1, e.g., the i-th data line Di during the first sensing period. In this manner, the current source unit 155 may include a first reference current source Iref1 and a first switch SW1. In exemplary embodiments, the first reference current source Iref1 may be configured to supply the first reference current to the first node ND1. To this end, the first switch SW1 may be coupled between the first reference current source Iref1 and the first node ND1, and, thereby, configured to allow the first reference current source Iref1 and the first node ND1 to be coupled to each other during the first sensing period.

The current sink unit 157 may be configured to supply a second reference current to the first node ND1, e.g., the i-th data line Di during the second sensing period. The current sink unit 157 may include a second reference current source Iref2 and a second switch SW2. In exemplary embodiments, the second reference current source Iref2 is configured to supply the second reference current to the first node ND1. To this end, the second switch SW2 may be coupled between the second reference current source Iref2 and the first node ND1, and, thereby, configured to allow the second reference current source Iref2 and the first node ND1 to be coupled to each other during the second sensing period.

According to exemplary embodiments, each of the first, second, and third switches SW1, SW2, and SW3 may be "turned on" or "turned off" in response to switching control signals (not shown) output from the timing controller 110. It is contemplated, however, that a controller (not shown) of the compensation unit 150 may control the operation of the first, second, and third switches SW1, SW2, and SW3 in response to information received from, for instance, the timing controller 110 and/or any other suitable source.

The operations of the timing controller 110, the data driver 120, the compensation unit 150, and the pixel 170 will be described in more detail with reference to FIGS. 5 to 10.

Figure 5:
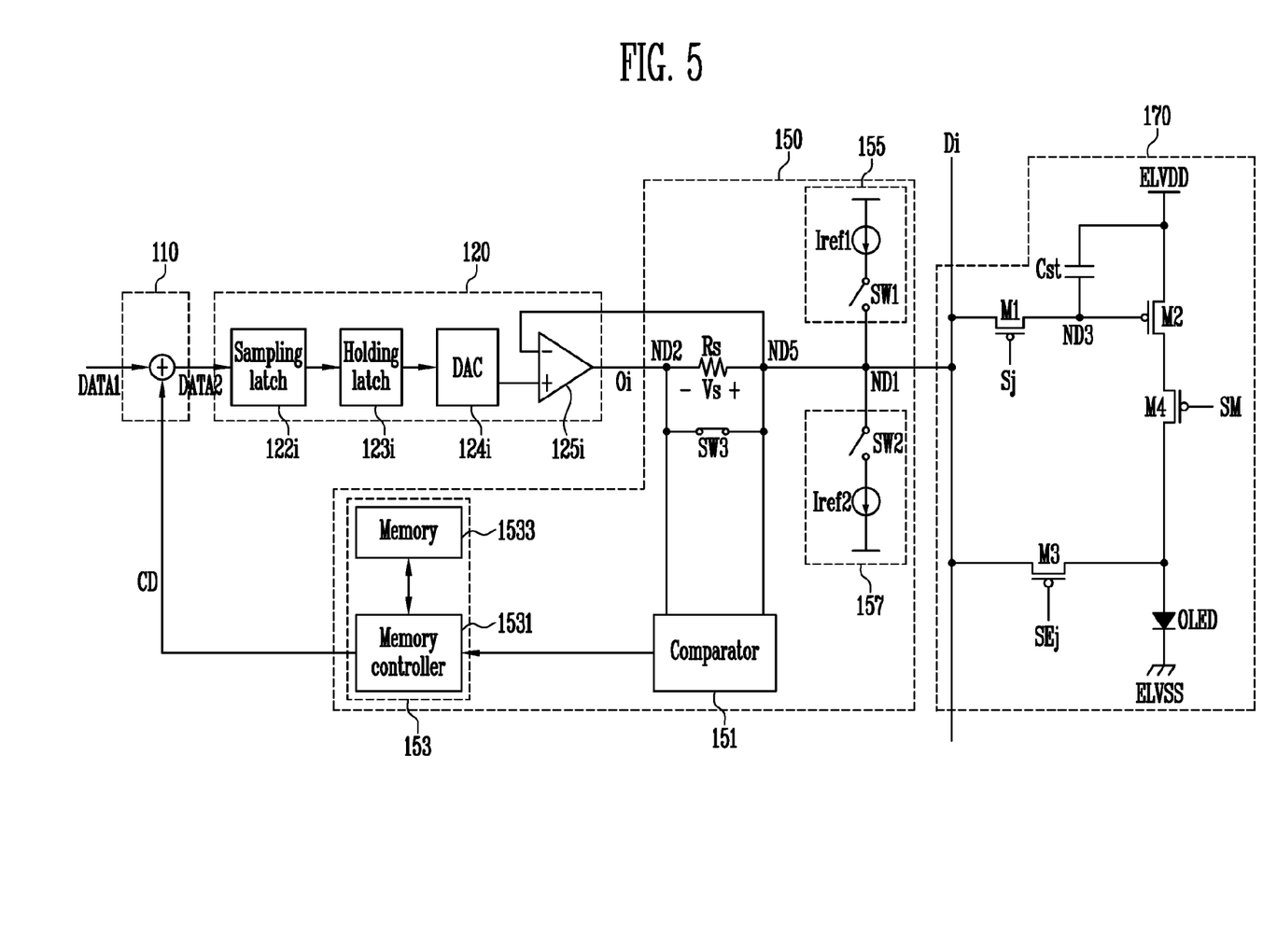
FIG. 5 is a schematic circuit diagram of the timing controller, the data driver, the compensation unit, and the pixel of the organic light emitting display of FIG. 1, during a display period, according to exemplary embodiments.
Figure 6:
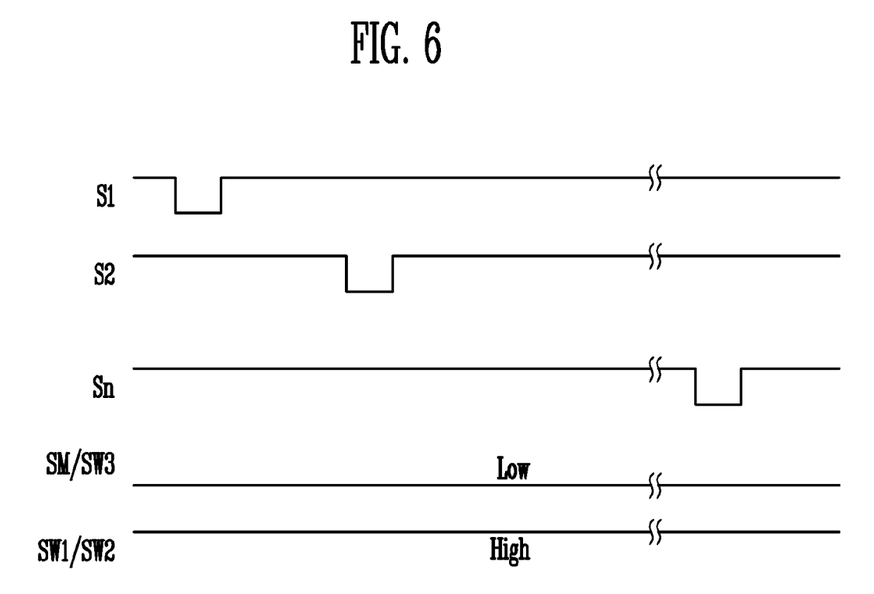
FIG. 6 is a waveform diagram of control signals provided to the timing controller, the data driver, the compensation unit, and the pixel of the organic light emitting display of FIG. 1, during the display period, according to exemplary embodiments.

FIG. 5 is a schematic circuit diagram of the timing controller 110, the data driver 120, the compensation unit 150, and the pixel 170 of the display 100 of FIG. 1, during a display period, according to exemplary embodiments. FIG. 6 is a waveform diagram of control signals provided to the timing controller 110, the data driver 120, the compensation unit 150, and the pixel 170 of the display 100 of FIG. 1, during the display period, according to exemplary embodiments. For illustrative convenience, FIGS. 5 and 6 correspond to data/information/signal exchange between the timing controller 110, the data driver 120, and the comparison unit 150 with respect to an i-th channel. In this manner, FIG. 5 illustrates a pixel 170 positioned at the intersection portion of an i-th data line Di, a j-th scan line Sj, and a j-th sensing control line SEj. To this end, an i-th output line Oi extends between the data driver 120 and the compensation unit 150 with respect to the i-th channel.

Referring to FIGS. 1, 5, and 6, the scan driver 130 may progressively supply a scan signal to the scan lines S1 to Sn during the display period. To this end, the sensing mode control signal line SM may be maintained a low level. Further, the first and second switches SW1 and SW2 may be "turned off," and the third switch SW3 may be "turned on." As such, the i-th output line Oi and the i-th data line Di may be coupled to each other during the display period. The data driver 120 may supply a data signal to the pixel 170, and the pixel 170 may emit light with a luminance corresponding to the data signal.

Figure 7:
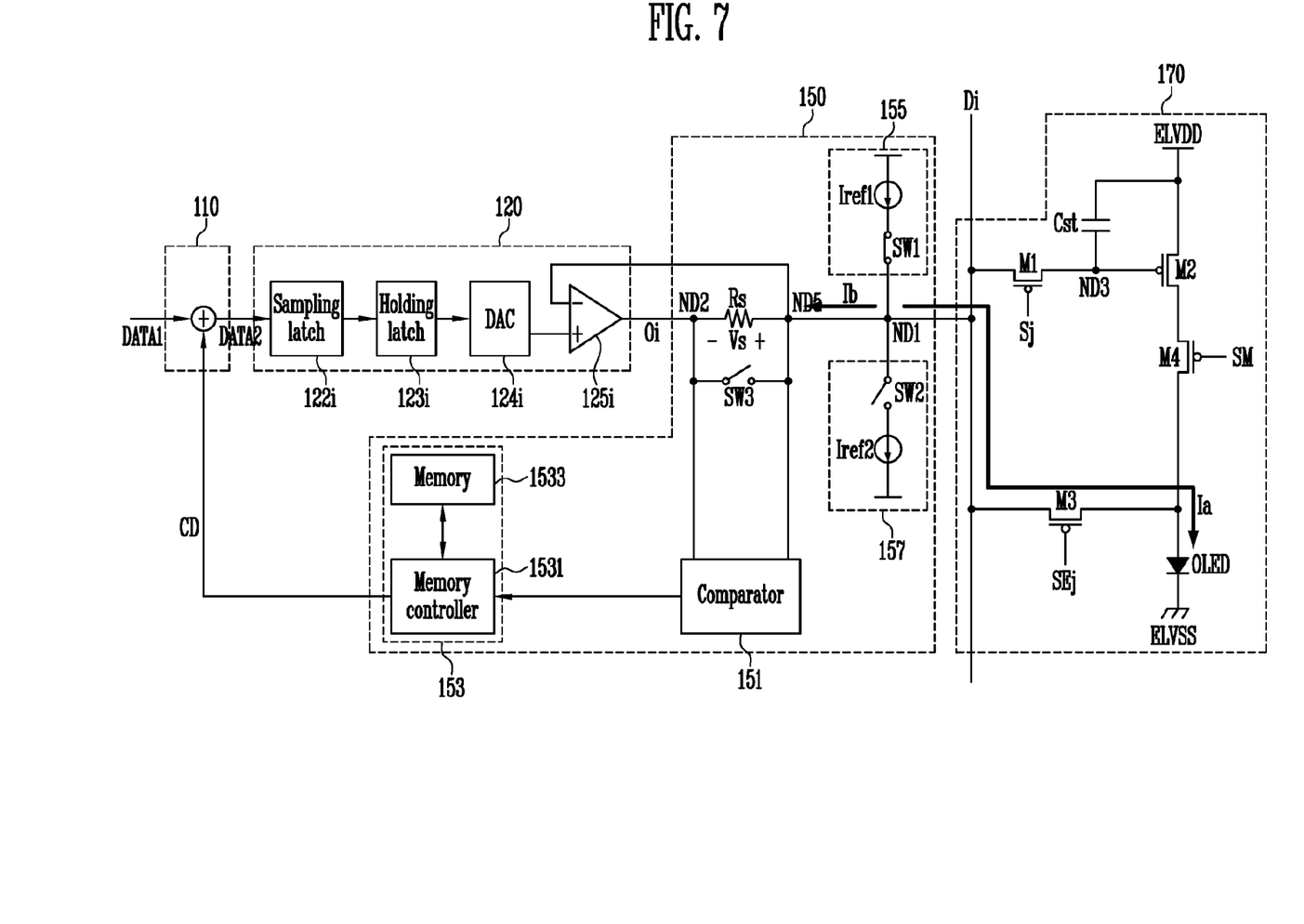
FIG. 7 is a schematic circuit diagram of the timing controller, the data driver, the compensation unit, and the pixel of the organic light emitting display of FIG. 1, during a first sensing period, according to exemplary embodiments.
Figure 8:
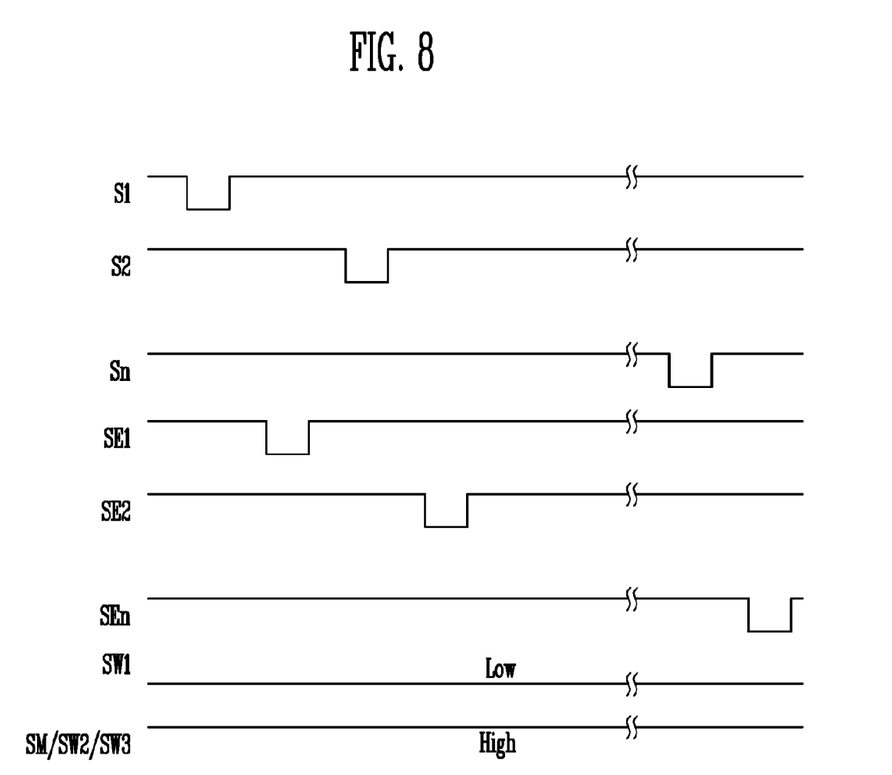
FIG. 8 is a waveform diagram of control signals provided to the timing controller, the data driver, the compensation unit, and the pixel of the organic light emitting display of FIG. 1, during the first sensing period, according to exemplary embodiments.

FIG. 7 is a schematic circuit diagram of the timing controller 110, the data driver 120, the compensation unit 150, and the pixel 170 of the display 100 of FIG. 1, during a first sensing period, according to exemplary embodiments. FIG. 8 is a waveform diagram of control signals supplied to the timing controller 110, the data driver 120, the compensation unit 150, and the pixel 170 of the display 100 of FIG. 1, during the first sensing period, according to exemplary embodiments. For illustrative convenience, FIGS. 7 and 8 correspond to data/information/signal exchange between the timing controller 110, the data driver 120, and the comparison unit 150 with respect to an i-th channel. In this manner, FIG. 7 illustrates a pixel 170 positioned at the intersection portion of an i-th data line Di, a j-th scan line Sj, and a j-th sensing control line SEj. To this end, an i-th output line Oi extends between the data driver 120 and the compensation unit 150 with respect to the i-th channel.

Referring to FIGS. 1, 7, and 8, the scan driver 130 may progressively supply a scan signal to the scan lines S1 to Sn during the first sensing period. To this end, the control line driver 140 may progressively supply a sensing control signal to the sensing control lines SE1 to SEn during the first sensing period and the sensing mode control line SM may be maintained at a high level. Further, the first switch SW1 may be "turned on," and the second and third switches SW2 and SW3 may be "turned off." As such, the current source unit 155 may supply the first reference current to the first node ND 1 during the first sensing period. In this manner, a current Ia may flow in the current path from the first node ND1 to the second power source ELVSS through the organic light emitting diode OLED.

According to exemplary embodiments, if the organic light emitting diode OLED is not degraded, the current Ia will be identical (or substantially identical) to the first reference current. In other words, the first reference current may be set such that no current Ib flows from the first node ND1 towards the second node ND2 through the sensing resistor Rs during the fabricating process of the organic light emitting display 100. If, however, the organic light emitting diode OLED is degraded, the current Ia may be decreased. As the first reference current supplied from the first reference current source Iref1 is constant, the current Ib flowing from the first node ND1 towards the second node ND2 through the sensing resistor Rs may be increased or decreased. In this manner, a voltage difference between the fifth and second nodes ND5 and ND2 is caused, at least part, by the current Ib. As such, the comparator 151 may output a comparison result signal based on the voltage difference between the fifth and second nodes ND5 and ND2, i.e., the voltage Vs across the sensing resistor Rs.

According to exemplary embodiments, the comparator 151 may output a comparison result signal for changing the value of the compensation data CD stored in the memory 1533 based on the magnitude and/or polarity of the voltage Vs. For example, when the voltage Vs has a positive value, the comparator 151 may output a comparison result signal for increasing the value of the compensation data CD based on the magnitude of the positive value. When the voltage Vs has a negative value, the comparator 151 may output a comparison result signal for decreasing the value of the compensation data CD based on the magnitude of the negative value. When the voltage at the fifth node ND5 is equal to the voltage at the second node ND2 (e.g., there is no or substantially no voltage drop across the sensing resistor Rs), the comparator 151 may output a comparison result signal to hold the value of the compensation data CD stored in the memory unit 153 constant and/or output a result indicating that no compensation data CD is required.

Further, the timing controller 110 may supply, to the data driver 120, a second data DATA2 obtained by adding the first data signal DATA1 and the compensation data CD, and supply a data signal corresponding to the second data DATA2 to the data driver 120. In this manner, the pixel 170 may receive a data signal in consideration of the degradation information of the organic light emitting diode OLED. As such, the pixel 170 can emit light with an intended (or substantially intended) luminance regardless of the degradation of the organic light emitting diode OLED.

Figure 9:
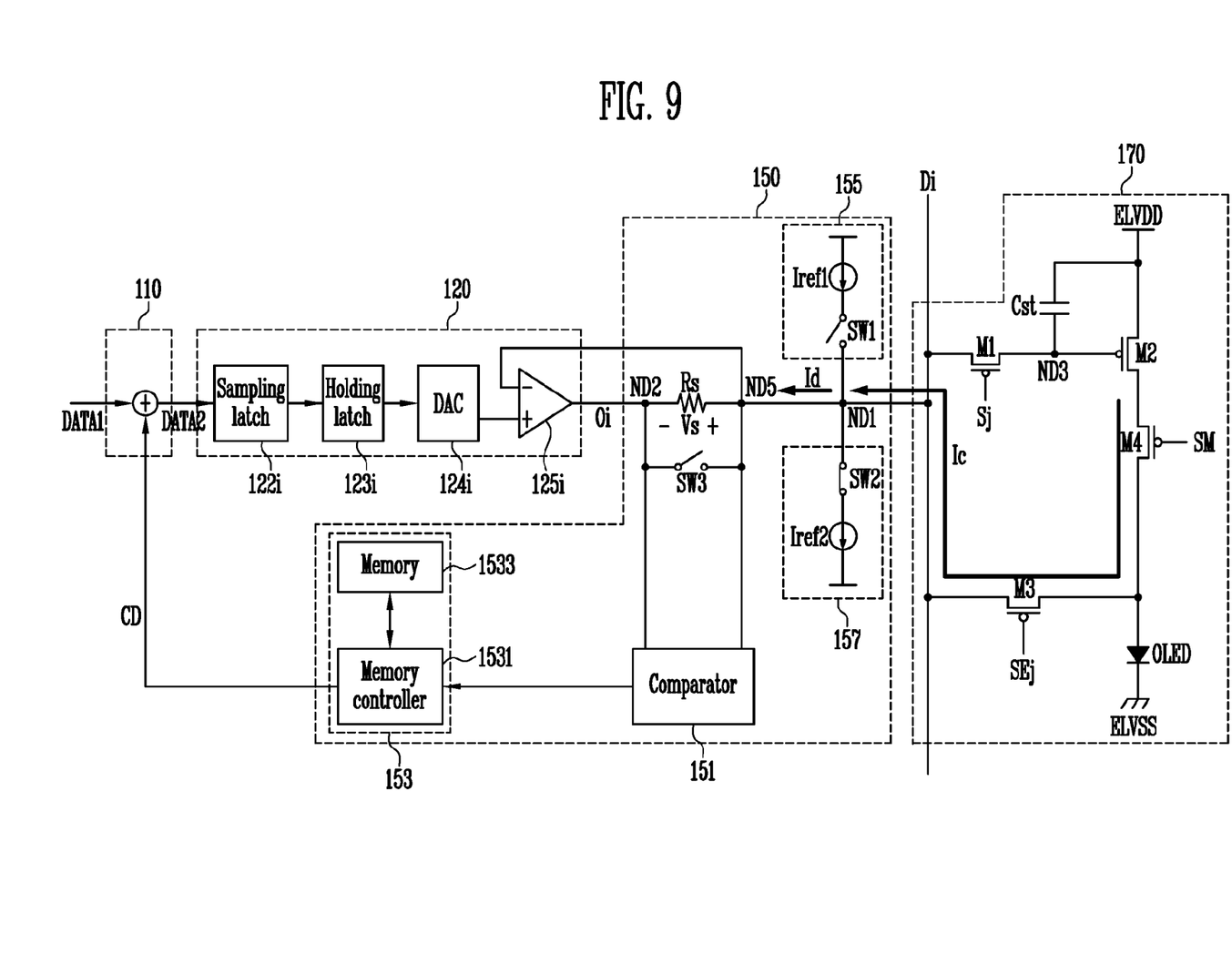
FIG. 9 is a schematic circuit diagram of the timing controller, the data driver, the compensation unit, and the pixel of the organic light emitting display of FIG. 1, during a second sensing period, according to exemplary embodiments.
Figure 10:
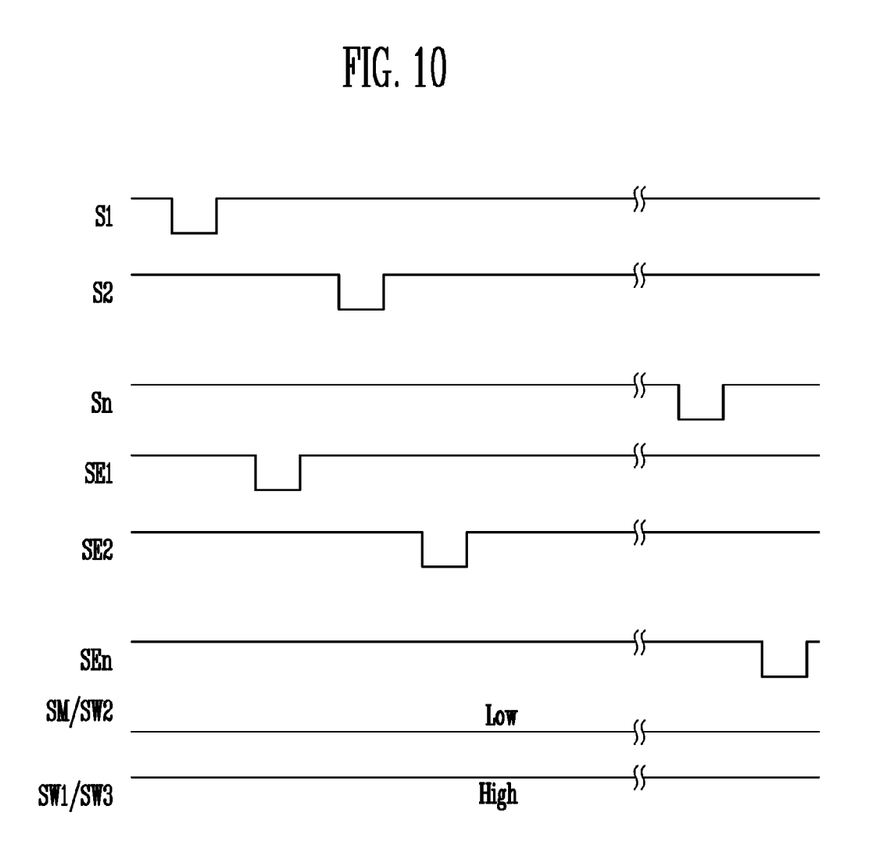
FIG. 10 is a waveform diagram of control signals provided to the timing controller, the data driver, the compensation unit, and the pixel of the organic light emitting display of FIG. 1, during the second sensing period, according to exemplary embodiments.

FIG. 9 is a schematic circuit diagram of the timing controller 110, the data driver 120, the compensation unit 150, and the pixel 170 of the display 100 of FIG. 1, during a second sensing period, according to exemplary embodiments. FIG. 10 is a waveform diagram of control signals supplied to the timing controller 110, the data driver 120, the compensation unit 150, and the pixel 170 of the display 100 of FIG. 1, during the second sensing period, according to exemplary embodiments. For illustrative convenience, FIGS. 9 and 10 correspond to data/information/signal exchange between the timing controller 110, the data driver 120, and the comparison unit 150 with respect to an i-th channel. In this manner, FIG. 9 illustrates a pixel 170 positioned at the intersection portion of an i-th data line Di, a j-th scan line Sj, and a j-th sensing control line SEj. To this end, an i-th output line Oi extends between the data driver 120 and the compensation unit 150 with respect to the i-th channel.

Referring to FIGS. 9 and 10, the scan driver 130 may progressively supply a scan signal to the scan lines S1 to Sn during the second sensing period. To this end, the control line driver 140 may progressively supply a sensing control signal to the sensing control lines SE1 to SEn during the first sensing period and the sensing mode control line SM may be maintained at the low level. Further, the second switch SW2 may be "turned on," and the first and third switches SW1 and SW3 may be "turned off."

According to exemplary embodiments, the voltage of the second power source ELVSS may be increased so that current does not flow through the organic light emitting diode OLED during the second sensing period. For example, the voltage of the second power source ELVSS may be set identical (or substantially identical) to the voltage of the first power source ELVDD. It is also contemplated that, in exemplary embodiments, a pixel 170b (such as shown in FIG. 2B) may be utilized, such that the voltage of the second power source ELVSS may or may not be changed, and the fifth transistor M5 may be "turned off," and, thereby, configured to prevent current flow through the organic light emitting diode OLED.

In exemplary embodiments, the current sink unit 157 may sink the second reference current from the first node ND 1 during the second sensing period. In this manner, a current Ic may flow in the current path from the first power source ELVDD to the first node ND 1 through the driving transistor, e.g., the second transistor M2. It is noted that the second reference current may be set such that no current Id flows from the first node ND1 towards the second node ND2 when the second transistor M2 is ideal, e.g., configured as (or substantially as) designed (or intended). However, when the threshold voltage/mobility of the second transistor M2 is not ideal (which may result, at least in part, from aspects of a semiconductor fabrication process, environmental forces, contaminants, etc.), the current Id may flow from the first node ND1 towards the second node ND2 through the sensing resistor Rs.

According to exemplary embodiments, a voltage difference between the fifth and second nodes ND5 and ND2 may be caused, at least in part, by the current Id. As such, the comparator 151 may output a comparison result signal based on the voltage difference between the fifth and second nodes ND5 and ND2, i.e., the voltage Vs across the sensing resistor Rs.

In exemplary embodiments, the comparator 151 may output a comparison result signal for changing the value of the comparison data CD stored in the memory 1533 based on the magnitude and/or polarity of the voltage Vs. For example, when the voltage Vs has a positive value, the comparator 151 may output a comparison result signal for increasing the value of the compensation data CD based on a magnitude of the positive value. When the voltage Vs has a negative value, the comparator 151 may output a comparison result signal for decreasing the value of the compensation data CD based on the magnitude of the negative value. When the voltage at the fifth node ND5 is equal to the voltage at the second node ND2 (e.g., there is no or substantially no voltage drop across the sensing resistor Rs), the comparator 151 may output a comparison result signal to hold the value of the compensation data CD stored in the memory unit 153 constant and/or output a result indicating that no compensation data CD is required.

Further, the timing controller 110 may supply, to the data driver 120, a second data signal DATA2 obtained by adding the first data signal DATA1 and the compensation data CD, and supply a data signal corresponding to the second data DATA2 to the data driver 120. In this manner, the pixel 170 may receive a data signal in consideration of the threshold voltage/mobility information of the driving transistor, e.g., of transistor M2. As such, the pixel 170 can emit light with an intended (or substantially intended) luminance regardless of the degradation and/or imperfects in the second transistor M2, such as may occur during the fabrication and/or use of the display 100.

It is noted that a conventional organic light emitting display may not be able to display an image with desired (e.g., uniform) luminance due to changes in the operational characteristics (e.g., efficiency, etc.) of one or more organic light emitting diodes of the conventional display, which may be caused by degradation of the one or more organic light emitting diodes. Practically speaking, an organic light emitting diode may degrade as time elapses, and, as such, light with a gradually different (e.g., lower) luminance may be emitted in correspondence with the same applied data signal. Conventionally, an image with non-uniform (or undesired) luminance may be displayed via the conventional display due to the non-uniformity of the threshold voltage/mobility of one or more driving transistors of one or more pixels of the conventional display.

According to exemplary embodiments, however, the compensation unit 150 and the organic light emitting display 100 including the same, may display a uniform (or substantially uniform) image by compensating for the degradation of one or more organic light emitting diodes and/or the threshold voltage/mobility between one or more driving transistors of the display 100. In this manner, display quality may be improved and the value of the display to consumers may be increased.

Although certain exemplary embodiments and implementations have been described herein, other embodiments and modifications will be apparent from this description. Accordingly, the invention is not limited to such embodiments, but rather to the broader scope of the presented claims and various obvious modifications and equivalent arrangements.

What is claimed is:

1. A compensation unit, comprising:
   a current source unit configured to supply a first reference current to a first node, the first node being configured to provide feedback to a data driver configured to drive at least one organic light emitting diode;

a current sink unit configured to sink a second reference current from the first node;

a sensing resistor coupled between the first node and a second node, the second node being configured to receive output from the data driver;

a comparator configured to:
  compare a voltage at the first node with a voltage at the second node, and
  output a comparison result signal based on the comparison; and a memory unit configured to:
  store compensation data related to operational disparity of the at least one organic light emitting diode and/or of at least one driving transistor,
  output the compensation data to affect the output of the data driver, and
  modify the compensation data based on the comparison result signal.

2. The compensation unit of claim 1, wherein:
the current source unit is configured to supply the first reference current to the first node during a first sensing period to enable determination of the operational disparity with respect to the at least one organic light emitting diode; and
the current sink unit is configured to sink the second reference current from the first node during a second sensing period to enable determination of the operational disparity of the at least one driving transistor.

3. The compensation unit of claim 2, wherein:
the first node is coupled to a first terminal of a buffer amplifier of the data driver; and
the second node is coupled to a second terminal of the buffer amplifier.

4. The compensation unit of claim 2, wherein the current source unit comprises:
a first reference current source configured to supply the first reference current to the first node;
a first switch coupled between the first reference current source and the first node;
the first switch is configured to be turned on in association with the first sensing period.

5. The compensation unit of claim 2, wherein the current sink unit comprises:
a second reference current source configured to sink the second reference current source from the first node;
a second switch coupled between the second reference current source and the first node; and
the second switch is configured to be turned on in association with the second sensing period.

6. The compensation unit of claim 2, further comprising:
a third switch coupled between the first and second nodes,
wherein the third switch is configured to be turned off in association with at least one of the first and second sensing periods.

7. The compensation unit of claim 1, wherein the operational disparity corresponds to:
degradation in light output of the at least one organic light emitting diode; and/or
a difference in threshold voltage or mobility of the at least one driving transistor.

8. An organic light emitting display, comprising:
a pixel unit comprising pixels arranged at intersection portions of data lines with scan lines and sensing control lines;
a data driver configured to supply data signals to the data lines via output lines;

a scan driver configured to supply a scan signal to the scan lines;
a control line driver configured to supply a sensing control signal to the sensing control lines; and
a compensation unit coupled between the output lines and the data lines,
wherein the compensation unit comprises a compensation circuit disposed between an i-th (where "i" is a natural number greater than zero) output line and an i-th data line, the compensation circuit comprising:
  a current source unit configured to supply a first reference current to the i-th data line,
  a current sink unit configured to sink a second reference current from the i-th data line,
  a sensing resistor coupled between the i-th data line and the i-th output line,
  a comparator configured to:
    compare a voltage of the i-th data line with a voltage of the i-th output line, and
    output a comparison result signal based on the comparison, and
  a memory unit configured to:
    store compensation data related to operational disparity of respective organic light emitting diodes of the pixels and/or of respective driving transistors configured to correspondingly drive the organic light emitting diodes,
    output the compensation data to affect the data signals of the data driver, and
    modify the compensation data based on the comparison result signal.

9. The organic light emitting display of claim 8, further comprising:
a timing controller configured to receive the compensation data from the memory unit,
wherein the timing controller is further configured to:
  convert an input data signal into a second data based on the compensation data, and
  supply the second data signal to the data driver.

10. The organic light emitting display of claim 9, wherein the data driver comprises:
a shift register unit configured to generate sampling signals;
a sampling latch unit configured to receive the second data from the timing controller and store respective portions of the second data in correspondence with the sampling signals;
a holding latch unit configured to receive and temporarily store the respective portions of the second data;
a signal generating unit configured to receive and convert the respective portions of the second data into the data signals; and
a buffer unit comprising buffer amplifiers configured to receive and supply the data signals to the output lines.

11. The organic light emitting display of claim 10, wherein a buffer amplifier, among the buffer amplifiers, disposed between the i-th output line and the i-th data line comprises:
a first input terminal coupled to the i-th data line;
a second input terminal coupled to the signal generating unit; and
an output terminal coupled to the i-th output line.

12. The organic light emitting display of claim 8, wherein a pixel, among the pixels, disposed at an intersection portion of the i-th data line, a j-th (where "j" is a natural number greater than zero) scan line, and a j-th sensing control line comprises:

an organic light emitting diode;
a first transistor coupled between the i-th data line and a node, the first transistor being configured to turn on in response to reception of the scan signal via the j-th scan line;
a storage capacitor coupled between a first power source and the node, the storage capacitor being configured to store a voltage associated with the first power source;
a second transistor configured to supply current corresponding to the voltage stored in the storage capacitor to a second power source through the organic light emitting diode; and
a third transistor coupled between the i-th data line and a first electrode of the organic light emitting diode, the third transistor being configured to turn on in response to reception of the sensing control signal via the j-th sensing control line.

13. The organic light emitting display of claim 12, wherein the pixel further comprises:
a fourth transistor coupled between the second transistor and the organic light emitting diode,
wherein the fourth transistor is configured to be turned off in association with the first or second reference currents being supplied to the i-th data line.

14. The organic light emitting display of claim 13, wherein the pixel further comprises:
a fifth transistor coupled between the fourth transistor and the organic light emitting diode,
wherein the fifth transistor is configured to be turned off in association with the second reference current being supplied to the i-th data line.

15. The compensation unit of claim 8, wherein the operational disparity corresponds to:
degradation in light output of at least one organic light emitting diode; and/or
a difference in threshold voltage or mobility of at least one driving transistor.

16. A method, comprising:
causing, at least in part, a data signal to be transmitted, via an output line coupled to a data line, to a pixel comprising a light emitting component configured to emit light;
causing, at least in part, a first reference current to be supplied to a first node of the output line, the first node being coupled to the pixel via the data line;
determining, in association with the first reference current, a first voltage difference between the first node and a second node of the output line; and
causing, at least in part, compensation data to be modified based on the first voltage difference,
wherein the compensation data relates to operational disparity of the light emitting component, the compensation data being configured to affect the data signal.

17. The method of claim 16, further comprising:
causing, at least in part, a second reference current to be sunk from the first node, the pixel further comprising a driving component configured to drive the light emitting component;
determining, in association with the second reference current, a second voltage difference between the first node and the second node;
causing, at least in part, the compensation data to be modified based on the second voltage difference,
wherein the compensation data further relates to operational disparity of the driving component.

18. The method of claim 17, wherein:
the operational disparity of the light emitting component corresponds to degradation in light output of the light emitting component; and
the operational disparity of the driving component corresponds to a difference in threshold voltage or mobility of the driving component.

19. The method of claim 17, wherein the first reference current is provided to the first node in association with a first sensing period and the second reference current is sunk from the first node in association with a second sensing period.

20. The method of claim 19, further comprising:
causing, at least in part, a switch to close in association with a display period of the light emitting component, the data signal being transmitted to the pixel as part of the display period; and
causing, at least in part, the switch to open in association with the first and second sensing periods.

21. The method of claim 19, wherein, in association with the second sensing period, current is prevented from flowing through the light emitting component.

22. The method of claim 21, wherein preventing the current from flowing through the light emitting component comprises at least one of:
a switching component electrically uncoupling the light emitting component from a first power source; and
a second power source to being modified to at least substantially match the first power source.

* * * * *